US011851339B2

(12) United States Patent
Arulraj et al.

(10) Patent No.: US 11,851,339 B2
(45) Date of Patent: Dec. 26, 2023

(54) JMZ-12, A DISORDERED AEI/CHA FAMILY OF ZEOLITES, ITS SYNTHESIS AND USE

(71) Applicant: JOHNSON MATTHEY PUBLIC LIMITED COMPANY, London (GB)

(72) Inventors: Kaneshalingam Arulraj, Royston (GB); Guy R. Chandler, Royston (GB); Jillian Collier, Reading (GB); Raquel Garcia, Billingham (GB); Alexander Green, Royston (GB); Nicholas Mcnamara, Wayne, PA (US); Paul Phillips, Royston (GB); Maria Pia Ruggeri, Reading (GB); Alessandro Turrina, Billingham (GB)

(*) Notice: Subject to any disclaimer, the term of this patent is extended or adjusted under 35 U.S.C. 154(b) by 0 days.

(21) Appl. No.: 17/652,777

(22) Filed: Feb. 28, 2022

(65) Prior Publication Data

US 2022/0281752 A1 Sep. 8, 2022

Related U.S. Application Data

(60) Provisional application No. 63/200,392, filed on Mar. 4, 2021.

(51) Int. Cl.
*C01B 39/48* (2006.01)
*B01J 29/70* (2006.01)
(Continued)

(52) U.S. Cl.
CPC ............ *C01B 39/48* (2013.01); *B01J 29/7065* (2013.01); *B01J 29/723* (2013.01); *B01J 29/783* (2013.01);
(Continued)

(58) Field of Classification Search
CPC combination set(s) only.
See application file for complete search history.

(56) References Cited

U.S. PATENT DOCUMENTS 5,139,759 A 8/1992 Cannan
6,812,372 B2 11/2004 Janssen
(Continued)

FOREIGN PATENT DOCUMENTS

WO WO-2018236809 A1 * 12/2018 .............. B01J 29/70
WO 2020096887 A1 5/2020
(Continued)

OTHER PUBLICATIONS

Treacy et al., "Collection of Simulated XRD Powders Patterns for Zeolites" Fifth Revised Edition, Elsevier, 2007, published on behalf of the Structure Commission of the International Zeolite Association, London Ser. A 433 (1991) pp. 9 and 479-481.
(Continued)

*Primary Examiner* — Binh Q Tran

(57) ABSTRACT

The present invention is directed to a method of preparing a synthetic crystalline material, designated as JMZ-12, with a framework built up by the disorder AEI and CHA structures, substantially free of framework phosphorous and prepared preferably in the absence of halides such as fluoride ions. Such method comprises the step of heating a reaction mixture under crystallization conditions for a sufficient period to form a disordered zeolite having both CHA and AEI topologies, wherein the reaction mixture comprises at least one source of aluminum, at least one source of silicon, a source of alkaline or alkaline-earth cations, and a structure directing agent containing at least one source of quaternary ammonium cations and at least one source of alkyl-substituted piperidinium cations in a molar ratio of 0.20 to about 1.4. The resulting zeolites are useful as catalysts, particularly when used in combination with exchanged transition metal(s) and, optionally, rare earth metal(s).

6 Claims, 8 Drawing Sheets

(51) Int. Cl.

| | | |
|---|---|---|
| *B01J 29/72* | (2006.01) | |
| *B01J 29/78* | (2006.01) | |
| *F01N 3/20* | (2006.01) | |
| *B01J 29/06* | (2006.01) | |
| *B01J 29/04* | (2006.01) | |
| *B01J 37/26* | (2006.01) | |
| *B01J 37/22* | (2006.01) | |
| *B01J 39/14* | (2006.01) | |
| *B01J 49/08* | (2017.01) | |
| *B01J 47/012* | (2017.01) | |
| *F01N 3/023* | (2006.01) | |
| *F01N 3/08* | (2006.01) | |

(52) U.S. Cl.
CPC ........... *F01N 3/2066* (2013.01); *B01J 29/048* (2013.01); *B01J 29/06* (2013.01); *B01J 37/22* (2013.01); *B01J 37/26* (2013.01); *B01J 39/14* (2013.01); *B01J 47/012* (2017.01); *B01J 49/08* (2017.01); *F01N 3/0231* (2013.01); *F01N 3/0814* (2013.01); *F01N 3/0821* (2013.01); *F01N 3/0871* (2013.01); *F01N 3/0885* (2013.01); *F01N 3/206* (2013.01); *F01N 3/2006* (2013.01); *F01N 2240/18* (2013.01); *F01N 2560/026* (2013.01); *F01N 2570/14* (2013.01); *F01N 2570/145* (2013.01); *F01N 2610/02* (2013.01); *F01N 2900/1612* (2013.01); *F01N 2900/1621* (2013.01); *F01N 2900/1624* (2013.01)

(56) References Cited

U.S. PATENT DOCUMENTS

| | | | |
|---|---|---|---|
| 7,094,389 | B2 | 8/2006 | Cao |
| 7,704,487 | B2 | 4/2010 | Breuninger |
| 2006/0127296 | A1 | 6/2006 | Mertens |
| 2008/0045767 | A1* | 2/2008 | Cao ........ C01B 39/023 423/709 |
| 2016/0243532 | A1* | 8/2016 | Dusselier ........ C10G 50/00 |
| 2018/0093895 | A1* | 4/2018 | Corma Canós ........ B01J 35/002 |
| 2018/0093897 | A1* | 4/2018 | Chen ........ B01J 29/76 |
| 2018/0117573 | A1* | 5/2018 | Fedeyko ........ B01J 35/04 |
| 2018/0134647 | A1* | 5/2018 | Ozmeral ........ B01J 37/30 |
| 2019/0105639 | A1* | 4/2019 | Maehama ........ B01J 29/763 |

FOREIGN PATENT DOCUMENTS

| | | |
|---|---|---|
| WO | 2020193987 A1 | 10/2020 |
| WO | 2021003947 A1 | 1/2021 |

OTHER PUBLICATIONS

Treacy, M. M. J.; Newsam, J. M.; Deem, M. W.: A general recursion method for calculating diffracted intensities from crystals containing planar faults. Proc. R. Soc. London Ser. A 433 (1991) 499 520.

\* cited by examiner

JMZ-12, A DISORDERED AEI/CHA FAMILY OF ZEOLITES, ITS SYNTHESIS AND USE

FIELD OF INVENTION

The present invention relates to a method of preparing a synthetic crystalline material. Specifically, the present invention relates to a method of preparing a synthetic material denominated JMZ-12 having a structure built up by the disorder AEI and CHA structures as well as their synthesis and their use in a catalyst composition.

BACKGROUND

Zeolites are crystalline or quasi-crystalline aluminosilicates constructed of repeating $SiO_4$ and $AlO_4$ tetrahedral units linked by oxygen atoms at their vertices. The tetrahedral units and their linkages form various building units which can be arranged in numerous ways to form molecular frameworks, also known as topologies. Linking these frameworks in regular and repeating fashions creates to intra-crystalline cavities and channels of molecular dimensions, and thus micro-porosity in the zeolite. The spatial relationships arising from regularly repeating these molecular frameworks also give rise to different crystalline morphologies. More generally, other tetrahedral structures, such as phosphates, can be used in combination with $AlO_4$ and optionally $SiO_4$ to form other types of molecular sieves such as silicoaluminophospates (SAPOs) or aluminophosphates (AlPOs).

Numerous types of synthetic zeolites have been synthesized and each has one or more unique frameworks based on the specific arrangement of its tetrahedral units. By convention, each framework type is assigned a unique three-letter code (e.g., "CHA" and "AEI") by the International Zeolite Association (IZA). These zeolites may be ordered or disordered. Ordered zeolites (e.g., regular crystalline solids) are crystal structures which are periodically ordered in 3-dimensions. These structures are classified based on their repeating periodic building units (PerBUs) and may be termed "end-member structures" if periodic ordering occurs in all three dimensions. Disordered molecular sieves, on the other hand, show periodic ordering in dimensions less than 3, e.g., 0, 1, or 2 dimensions. In disordered structures, the stacking sequence of the PerBUs deviates from periodic ordering. This may also be explained as a structural or stacking disorder of structurally invariant PerBUs. These disorders manifest in a single crystalline morphology.

The selected molecular sieve may have a disorder including, but not limited to, stacking disorders, planar faults, and intergrowth of phases. These types of disorders are not mutually exclusive. In a layered structure with a stacking disorder, a single framework type may deviate from periodic ordering. A planar fault in the framework structure may include, for example, structures on either side of the plane which are mirror images (e.g., a "twin plane" phenomenon) or rotation of one part of a crystal, on a specific plane, with respect to another. An intergrowth of phases may include a transition from one framework structure to another framework structure. The zeolite may include any one or more types of disorders leading to any known or unknown disordered framework. Known disordered frameworks include, for example, zeolite Beta (BEA) and AEI/CHA intergrowths.

The process of zeolite crystallization cannot be adequately described merely by classical variables of reactant composition, temperature, and pressure. Crystallization also involves polymerization-depolymerization, solution-precipitation, nucleation-crystallization, and other complex phenomena encountered in aqueous colloidal dispersions. Specific zeolite topologies are predicated on the interaction of a structure directing agent (SDA), also referred to as a "template" or "templating agent" and the reaction mixture chemistry (e.g., all the other reaction parameters governing the reaction mixture, such as oxide composition, temperature, time, reagent type, and pH). SDAs are typically complex organic molecules which guide or direct the molecular shape and pattern of the zeolite's framework. Generally, the SDA serves to position hydrated silica and alumina and/or as a mold around which the zeolite crystals form. After the crystals are formed, the SDA is removed from the interior structure of the crystals, leaving a molecularly porous aluminosilicate cage.

Synthesis techniques for some zeolite intergrowths are known. For example, U.S. Pat. No. 7,704,487 describes the use of diethylenetriamine as a template for the synthesis of zeolite BEA and U.S. Pat. No. 5,139,759 discloses the synthesis of zeolite beta with diethanolamine and a tetraethylammonium bromide. U.S. Pat. No. 6,812,372 describes the synthesis of a SAPO AEI/CHA intergrowth using tetraethylammonium hydroxide (TEAOH) as a template in the presence of phosphoric acid, alumina, and silica. U.S. Pat. No. 7,094,389 discloses the synthesis of a large crystal aluminosilicate AEI/CHA intergrowth using two different structure directing agents, one for synthesis of CHA framework molecular sieves and the other for the synthesis of AEI framework molecular sieves.

Molecular sieves have numerous industrial applications. For example, light olefins, particularly ethylene and propylene, can be produced by contacting a feedstock containing oxygenated organic compounds, such as methanol or dimethyl ether, with a SAPO and/or AlPO-containing catalyst. Aluminosilicate zeolites have been used as a catalyst for the Selective Catalytic Reduction (SCR) of $NO_x$ present in exhaust gases of internal combustion engines, gas turbines, coal-fired power plants, and the like. Preferred SCR catalyst are those which have high activity over a wide range of operating temperatures, and which maintain their high activity after being subjected to very high temperatures. While some catalyst may perform well under certain conditions, there remains a need for more hydrothermally stable and robust zeolites that have achieve high catalytic activity after exposure to very high temperatures.

The present invention solves this problem and other by providing improved zeolites with high catalytic performance, catalysts made with such zeolites, and methods for synthesizing such zeolites.

SUMMARY OF THE INVENTION

Novel zeolite synthesis methods have been discovered which produce zeolites having superior catalytic properties. More particularly, new disordered AEI/CHA zeolites, named as JMZ-12 throughout this document, can be synthesized, preferably in the absence of halides such as fluoride, using a combination of two SDAs comprise a quaternary ammonium cation (Q) and an alkyl-substituted piperidinium (P) cation in a molar ratio (Q/P) of about 0.20 to about 1.4. When containing exchanged copper, the resulting JMZ-12 zeolites were found to have superior SCR catalytic properties, in particular NO conversion and $N_2O$ selectivity, compared to copper exchanged CHA zeolite and copper exchanged AEI zeolites, especially after hydrothermal aging.

Accordingly, provided is a method for synthesizing zeolites which involves heating a reaction mixture under crystallization conditions for a sufficient period to form a disordered zeolite having both CHA and AEI topologies, wherein the reaction mixture comprises at least one source of aluminum, at least one source of silicon, a source of alkaline or alkaline-earth cations, and a structure direction agent containing at least one source of quaternary ammonium cations (Q) and at least one source of alkyl-substituted piperidinium cations (P) in a molar ratio Q/P of about 0.20 to about 1.4.

Also provided is a JMZ-12 zeolite synthesized by the methods herein.

Also provided is a disordered zeolite having a d50 crystal size of less than 0.5 microns and having a predominate phase of CHA and AEI topologies wherein the CHA and AEI topologies are present in a molar ratio of about 95:5 to about 5:95.

Also provided is a disordered zeolite comprising a predominate phase of CHA and AEI topologies wherein the CHA and AEI topologies are present in a molar ratio of about 95:5 to about 5:95; and a CHA-rich surface layer topology and an AEI-rich interior topology.

Also provided is a disordered zeolite comprising a predominate phase of CHA and AEI topologies wherein the CHA and AEI topologies are present in a molar ratio of about 95:5 to about 5:95; and surface layer SAR and a bulk SAR, wherein the surface SAR is lower than the bulk SAR.

Also provided is a catalyst composition for the selective reduction of NO comprising a JMZ-12 zeolite having a predominate phase of CHA and AEI topologies wherein the CHA and AEI topologies are present in a molar ratio of about 95:5 to about 5:95, having a d50 crystal size of less than 0.5 micron, and having a silica-to-alumina ratio (SAR) of about 10 to about 25; and one or more exchanged transition metals selected from copper (Cu), iron (Fe), manganese (Mn), nickel (Ni), molybdenum (Mo), and zinc (Zn), wherein said one or more exchanged transition metals, wherein the zeolite and one or more exchanged transition metal are present in a weight ratio of about 100:1 to about 20:1. The catalyst composition may optionally also contain one or more rare earth metals.

Also provided is a catalytic article comprising a plurality of walls of a honeycomb flow-through substrate or a wall-flow filter; and a JMZ-12 zeolite catalyst coated on and/or within at least a portion of said walls, wherein (i) the JMZ-12 zeolite catalyst has a predominate phase of CHA and AEI topologies wherein the CHA and AEI topologies are present in a molar ratio of about 95:5 to about 5:95; (ii) the JMZ-12 zeolite catalyst having a d50 crystal size of less than 0.5 micron, and having a silica-to-alumina ratio (SAR) of about 10 to about 25; and (iii) one or more exchanged transition metals selected from copper (Cu), iron (Fe), manganese (Mn), nickel (Ni), molybdenum (Mo), and zinc (Zn), wherein said one or more exchanged transition metals wherein the zeolite and one or more exchanged transition metal are present in a weight ratio of about 100:1 to about 20:1.

DETAILED DESCRIPTION OF THE INVENTION

Figure 1:
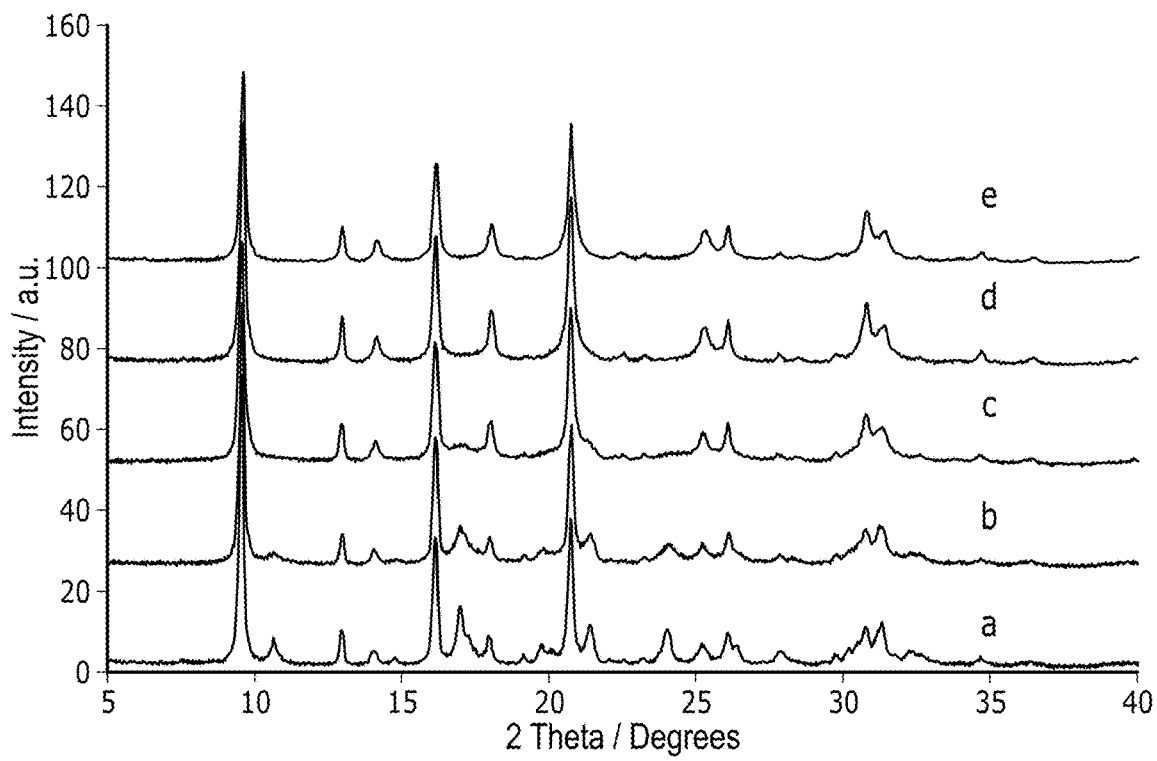
FIG. 1 shows Powder X-ray Diffraction (XRD) patterns of as made (SDA containing) JMZ-12 samples of: a) Example 1; b) Example 2; c) Example 3; d) Example 4; e) Example 5.

A novel disordered zeolite family JMZ-12, having a structure based on a disordered intergrowth of the AEI and CHA topologies can be obtained through the synthesis techniques of the present invention. The synthesis techniques typically utilize a reaction mixture that contains water, a source of silica, a source of alumina, and a mixture of two structure directing agents (SDAs) that includes both a quaternary ammonium component (Q) and an alkyl-substituted piperidinium component (P). Preferably, these two components of the SDA are present in the structure directing agent in a molar ratio Q/P of about 0.20 to about 1.4. When heated under conditions suitable for crystal formation, solid disordered AEI/CHA zeolite crystals result.

As used herein, the term "zeolite" means a crystalline or quasi-crystalline aluminosilicate molecular sieving having open channels and exchangeable cations. Thus, the term "zeolite" refers to aluminosilicates as a specific subcategory of molecular sieves and does not include other types of molecular sieves such as aluminophosphates (AlPOs), silicoaluminophosphates (SAPOs).

As used herein, the term "CHA" refers to the CHA type topology or framework as recognized by the International Zeolite Association (IZA) Structure Commission and the term "CHA zeolite" means an aluminosilicate in which the primary crystalline phase is CHA.

As used herein, the term "AEI" refers to the AEI type topology or framework as recognized by the International Zeolite Association (IZA) Structure Commission and the term "AEI zeolite" means an aluminosilicate in which the primary crystalline phase is AEI.

As used herein, the term "disordered AEI/CHA zeolite" refers to a zeolite wherein the primary crystalline phase is a combination of AEI and CHA topologies.

As used herein, the term "AEI/CHA zeolite intergrowth" refers to a disordered AEI/CHA zeolite having regions of CHA topology and regions of AEI topology on a submicroscopic scale (i.e., below 100 nm) and within a single crystalline phase or as a single crystalline morphology.

The relative proportions of each of the intergrowth phases can be analyzed by X-ray diffraction and, in particular, by comparing the observed patterns with calculated patterns generated using algorithms to simulate the effects of stacking disorder. DIFFaX is a fortran computer program based on a mathematical model for calculating intensities from crystals containing planar faults (Treacy, M. M. J.; Newsam, J. M.; Deem, M. W.: A general recursion method for calculating diffracted intensities from crystals containing planar faults. Proc. R. Soc. London Ser. A 433 (1991) 499-520). DIFFaX is the simulation program selected by, and available from, the International Zeolite Association to simulate the powder XRD patterns for randomly intergrown phases (see "Collection of Simulated XRD Powder Patterns for Zeolites," Fifth Revised Edition, Elsevier, 2007, published on behalf of the Structure Commission of the International Zeolite Association). DIFFaX has been used to theoretically study zeolite beta (Treacy et al. 1991), AEI-CHA intergrowths in numerous patents and many other intergrowths in zeolites and other materials.

After the desired crystallization is complete, the solid precipitate containing the zeolite crystals can be separated from the mother liquor which can then be discarded or recycled. Preferably, the separated zeolite crystals are treated to eliminate residual SDAs from their crystal structure, followed by one or more additional processing steps such as washing, purifying, drying, calcining, and conditioning to produce disordered AEI/CHA zeolite materials (JMZ-12 family) having the desired physical and chemical characteristics. Additional processing steps may include non-metal ion exchange to produce a JMZ-12 zeolite in the ammonium or proton form. JMZ-12 zeolites can also undergo post synthesis treatment, such as incorporation of a catalytically active metal via ion exchange, to further enhance catalytic performance.

The alkyl-substituted piperidinium (P) component of the SDA is preferably piperidinium having two alkyl group attached to the ring nitrogen and one or two additional alkyl groups at the -2-, -3-, or -6- ring position. Preferably, the alkyl groups are methyl, ethyl, or a combination thereof. For example, suitable alkyl-substituted piperidinium compounds include non-halide forms of N,N-dimethyl-3,3-dimethylpiperidinium, N,N-methylethyl-3,3-dimethylpiperidinium, N,N-dimethyl-2-methylpiperidinium, N,N-dimethyl-2,6-dimethylpiperidinium, N,N-diethyl-2,6-dimethylpiperidinium, N-ethyl-N-methyl-2,6-dimethylpiperidinium, and combinations thereof. Most preferably, the alkyl-substituted piperidinium is N,N-dimethyl-3,5-dimethylpiperidinium hydroxide (3,5-DMDMPOH). Preferably, the alkyl-substituted piperidinium component is not in halide form, e.g., is not N,N-dimethyl-3,5-dimethylpiperidinium fluoride, N,N-dimethyl-3,5-dimethylpiperidinium bromide, N,N-dimethyl-3,5-dimethylpiperidinium iodide, or N,N-dimethyl-3,5-dimethylpiperidinium chloride.

The quaternary ammonium component (Q) of the SDA is preferably non-cyclic and more preferably is a tetraalkyl ammonium compound, such as tetraethyl ammonium hydroxide (TEAOH) or tetraethyl ammonium acetate. Most preferably, the template is tetraethyl ammonium hydroxide. Preferably, the quaternary ammonium component is not in halide form, i.e., is not tetraethyl ammonium fluoride, tetraethyl ammonium bromide, or tetraethyl ammonium chloride.

The alkyl-substituted piperidinium component (P) and the quaternary ammonium (Q) component of the SDA are preferably present in a molar ratio Q/P of about 0.20 to about 1.4. For example, the molar ratio quaternary ammonium to alkyl-substituted piperidinium can be 0.30; 0.45; 0.63; 1 and the like. It has been found that the molar ratio of quaternary ammonium to alkyl-substituted piperidinium can be tuned to achieve different members of the JMZ-12 family of zeolites containing differing degree of disorder between the pure AEI and CHA structures. For example, relatively higher amounts of 3,5-DMDMPOH yield AEI-rich disordered zeolites and relatively higher amounts of TEAOH yield CHA-rich disordered zeolites. However, molar ratios outside of these ranges tend to form zeolites compositions other than intergrowths.

The reaction mixture used to form JMZ-12 is preferably free, or substantially free, of halides, including fluorine. JMZ-12 zeolites that are substantially free of halides have less than 1 ppm halide. JMZ-12 zeolites that are free of halides have less than 0.5 ppm halide or no detectable halide. The presence of fluorine or other halides in the synthesis medium and/or the resulting zeolite crystals is disadvantageous in most industrial applications due to the highly corrosive and hazardous nature of hydrofluoric acid or fluorinated derivatives which may be present in the reactive mixture or intermediate products. The presence of halides such as fluorine could also adversely affect the desired silica-to-alumina ratio (SAR) of the resulting disordered zeolite due to the fluorine ions interfering with aluminum being incorporation into the crystal lattice. High SAR zeolites tend to be more thermally stable, but the low level of available alumina sites limits the introduction and stabilization of catalytically active metals, such as copper. Thus, a low quantity of aluminum in the lattice may prevent the preparation of efficient copper exchanged JMZ-12 zeolite catalysts for applications such the selective catalytic reduction (SCR) of NO), in an exhaust gas.

The reaction mixture used to form JMZ-12 is preferably free or substantially free of source phosphorous. JMZ-12 zeolites that are substantially free of framework phosphorous have less than 1 ppm phosphorous. JMZ-12 zeolites that are free of framework phosphorous have less than 0.5 ppm phosphorous or no detectable phosphorous. The zeolites of the present invention are not silicoaluminophosphates (SAPOs) and thus do not have an appreciable amount of phosphorous in their framework. That is, the zeolite frameworks do not have phosphorous as a regular repeating unit and/or do not have an amount of phosphorous that would affect the basic physical and/or chemical properties of the material, particularly with respect to the material's capacity to selectively reduce NOx over a broad temperature range.

Suitable silica sources include, without limitation, sodium silicate, fumed silica, silicates, precipitated silica, colloidal silica, silica gels, silica hydrogel, silicic acid, tetraalkyl orthosilicates, aluminosilicate zeolites having a SAR of less than 15, preferably less than 10, dealuminated zeolites such as dealuminated zeolite Y, and silicon hydroxides and alkoxides. Where zeolites are the silica source, the cation type may be at least one type selected from the group consisting of sodium type (Na type), proton type ($H^+$ type), and ammonium type ($NH_4$ type), where proton type is preferred. Silica sources resulting in a high relative yield are preferred.

Suitable alumina sources include sodium aluminate, aluminates, alumina, zeolites, aluminum colloids, boehmites, pseudo-boehmites, aluminum hydroxides, aluminum salts such as aluminum sulfate and alumina chloride, aluminum hydroxides and alkoxides, and alumina gels. Preferably, the source of alumina is an aluminosilicate zeolite or derivative thereof. Preferred zeolites include faujasite (FAU), zeolite Y, and zeolite X, with FAU being most preferred. Preferably, the silica to alumina mole ratio of these zeolites should be from about 2 to about 20, more preferably, the from about 2 to about 10, and most preferably from about 5 to about 10. Where zeolites are the alumina source, the cation type may be at least one type selected from the group consisting of sodium type (Na type), proton type (1-1±type), and ammonium type ($NH_4$ type), where proton type is preferred. Alumina sources resulting in a high relative yield are preferred.

Both the silica source and alumina source may be from zeolites, that is, the silica source is a zeolite with a high SAR (e.g., greater than 100) and the alumina source is a zeolite with a low SAR (e.g., lower than 10). Other examples of alumina and silica sources used in combination include a zeolite alumina source, such as FAU, and a silica source selected from sodium silicate, fumed silica, and colloidal silica.

The reaction mixture preferably includes a source of alkali metal, such as one or more metals selected from sodium, potassium, cesium and lithium. The form of alkali metal may be, for example, hydroxides (e.g., sodium hydroxide (NaOH) or potassium hydroxide (KOH)), oxides (such as sodium oxide ($Na_2O$) or potassium oxide ($K_2O$)), carbonates, sulfates, nitrates, acetates, silicates, aluminates, salts of carboxylic acids, and combinations of two or more of these. Preferred sources include alkali metal hydroxide, such as NaOH, and alkali metal oxide such as sodium oxide ($Na_2O$) and potassium oxide ($K_2O$). An alkali metal may also be supplied via a zeolite when used as the alumina source. Additionally, when the silica source and the alumina source contain an alkali metal, that alkali metal may also serve as an alkali source. Preferably, the alkali metal component is not in halide form, i.e., is not sodium, potassium, cesium and lithium fluoride, bromide, chloride.

Purified water may be used as the water, but each of the raw materials may also be used in the form of an aqueous solution.

The reaction mixture preferably has the following composition:
  molar ratio of silica relative to alumina ($SiO_2/Al_2O_3$ ratio) of about 10 to about 100, for example from about 55 and to about 75;
  molar ratio of alkali metal oxide relative to silica ($X_2O/SiO_2$ ratio, X=Na, K, Cs, Li) of about 0.01 to about 0.5, for example from about 0.01 to about 0.3;
  molar ratio of SDA relative to silica ($SDA/SiO_2$ ratio) of about 0.01 to about 0.5, for example from about 0.05 to about 0.2;
  molar ratio of OH relative to silica ($OH/SiO_2$ ratio) of about 0.1 to about 0.9, for example from about 0.6 to 0.8;
  molar ratio of water ($H_2O$) relative to silica ($H_2O/SiO_2$ ratio) of about 3 to about 25, for example from about 5 to about 15.

Crystals of the JMZ-12 zeolites are formed by a hydrothermal synthesis process preferably performed in autoclaves or other hermetically sealed container, under static or dynamic conditions, at a temperature between 100° C. and 200° C., preferably from 120-175° C., and for period of time of between 0.5 days to 10 days, preferably from 18-96 hours.

Preferably, the reaction mixture results in a highly pure disordered zeolite having little to no remaining alumina sources. For example, the crystallization process preferably consumes 90-100 weight percent of the source of alumina, such as 95-99 weight percent, which is incorporated into the zeolite framework. Thus, the reaction mixture and resulting zeolite crystals can be free or substantially free of alumina-based impurities, such as FAU zeolite. For example, the resulting disordered AEI/CHA member of the JMZ-12 family zeolite can have less than 5 weight percent FAU zeolite, preferably less than 1 weight percent FAU zeolite, and even more preferably less than 0.1 weight percent FAU zeolite.

Preferably, the crystallization step does not involve the use of AEI or CHA seed crystals because such crystals can degrade the purity of the resulting JMZ-12 zeolites—for example, by promoting the formation of physical mixtures of AEI and CHA zeolites instead of the desired disordered zeolite.

The precipitated zeolite crystals can be recovered by any well-known separation technique, such as, for example, decantation, filtration, ultrafiltration, centrifugation or any other solid-liquid separation technique, and combinations thereof. Preferred methods of separation include mechanical separation such as vacuum filtration. The recovered solids can then be rinsed with deionized or purified water and dried at an elevated temperature for several hours. The drying step can be performed under vacuum or at atmospheric pressure.

In the drying step, the water content is removed from the zeolite after the crystallization step or after the washing step. The conditions of the drying step are discretionary, but an example is drying the zeolite after the crystallization step or after the washing step by leaving the zeolite to stand for at least two hours, for example 4-24 hours, in an environment at a temperature not less than 50° C. and not greater than 150° C.

The process of the present invention may further comprise one or more steps to eliminate or extract the organic content retained inside the zeolite cavities (e.g., the SDA or byproducts of the SDA), such as heating the material to a temperature greater than 25° C., preferably between 100° C. and 1000° C., for a period preferably ranging between about 1 to 25 hours.

The zeolite material may be calcined, preferably in an oxygen containing environment, such as in air, at a temperature of about 450 to 600° C., preferably about 500-550° C., for a period from about 2-10 hours, for example from about 5 to 7 hours.

After crystallization, the JMZ-12 zeolites may have a metal ion such as an alkali metal ion at its ion exchange site. In an optional ion exchange step, the alkali metal ion is exchanged with a non-metal cation such as an ammonium ion ($NH_4^+$) or a proton ($H^+$). Ion exchange to an ammonium ion may be performed by mixing the zeolite into an ammonium sulfate aqueous solution followed by stirring. Furthermore, ion exchange to a proton may be performed by ion-exchanging the zeolite with ammonia and calcining it.

In addition to the abovementioned synthesis techniques, the present invention pertains to novel disordered zeolites having at least two different small-pore topologies, in particular, CHA and AEI. These disordered AEI/CHA zeolites (JMZ-12 family of materials) include crystals wherein the overall ratio of CHA topology to AEI topology is from about 5:95 to about 95:5, preferably about 60:40 to 40:60. In an exemplary embodiment, the mole ratio of AEI:CHA may range from about 5:95 to about 95:5. Examples of other topology ratios include 10:90, 15:85, 20:80, 25:75, 30:70, 40:60, 50:50, 60:40, 70:30, 75:25, 80:20, 85:15, and 90:10. The composition's topology mole ratio can be determined by analytical techniques such as X-ray Diffraction (XRD) analysis. In particular, the composition's topology mole ratio can be determined by DIFFaX analysis of the X-ray diffraction patterns collected on the dehydrated H-form for each sample.

The synthesis methods described herein can produce JMZ-12 crystals with a high degree of purity, and preferably are phase pure. As used herein, the term "pure phase" means the disordered AEI/CHA zeolite (JMZ-12) wherein AEI and CHA together make up at least 95 mole percent of zeolite's topology. For example, JMZ-12 contains at least 95 mole percent, or even at least 97 mole percent of AEI and CHA frameworks. In certain embodiments, JMZ-12 is substantially free of other crystalline phases and frameworks. For example, JMZ-12 crystals synthesized by the methods described herein can be substantially free of frameworks such as MOR, FAU, GME, AFX, AFT, and LEV. As used herein, the term "substantially free" means JMZ-12 contains less than one percent of a zeolite framework other than CHA or AEI.

As used herein, the SAR refers to the synthesized zeolite crystal and not to the starting synthesis gel. The SAR of the zeolites can be determined by conventional analysis. This ratio is intended to be as close as possible to the ratio in the rigid atomic framework of the zeolite crystal and to exclude silicon or aluminum in the binder or in cationic or other form within the channels. Since it may be difficult to directly measure the silica to alumina ratio (SAR) of the zeolite after it has been combined with a binder material, particularly an alumina binder, these silica to alumina ratios will be relative to the SAR zeolite per se, i.e., prior to combining the zeolite with the other catalyst components.

The disordered JMZ-12 crystals can have a bulk silica-to-alumina ratio (SAR) of about 10 to about 25, for example, about 12 to about 18, about 14 to about 16, about 10 to about 13, or about 21 to about 25 As used herein, the term "bulk SAR" means the SAR of a crystal or sample of crystals taken as a whole. A zeolite's bulk SAR can be differentiated from its surface layer SAR.

JMZ-12 crystals can have a surface layer silica-to-alumina ratio (SAR) that is lower than the SAR of the interior of the crystals or the bulk SAR. As used herein, the term "surface layer" means from a layer of the zeolite from the outer planar surfaces to a particular depth between about 2 nm and about 12 nm. For example, the surface layer of a crystal is a layer from the crystal's outer planar surface to a depth of 2 nm, 4 nm, 6 nm, 8 nm, 10 nm, or 12 nm.

The ratio of surface layer SAR to bulk SAR can be about 0.4 to about 0.95, for example about 0.5 to 0.7 or about 0.8 to about 0.90. For example, a crystal may have a surface layer SAR of about 5 to about 15 and a bulk SAR of about 12 to about 18. Other examples include a surface layer SAR of about 5-8 and a bulk SAR of about 13-16 or a surface layer SAR of about 12-14 and a bulk SAR of about 14-18.

JMZ-12 crystals can have a d50 crystal size that is 0.5 micron or less, for example, about 0.2 micron or less, about 0.1 micron or less, from about 0.05 to about 0.5 microns, from about 0.05 to 0.1 microns, or from about 0.1 to about 0.25 microns. More preferably, JMZ-12 zeolite crystals have a d90 crystal size that is 0.5 micron or less, for example, about 0.2 micron or less, about 0.1 micron or less, from about 0.05 to about 0.5 microns, from about 0.05 to 0.1 microns, or from about 0.1 to about 0.25 microns. JMZ-12 crystals may have both a d50 and a d90 value as described above.

The crystal size is based on individual crystals, preferably cubic or tetragonal crystals. Crystal size is the length of longest diagonal of the three-dimensional crystal. Direct measurement of the crystal size can be performed using microscopy methods, such as SEM and TEM. For example, measurement by SEM involves examining the morphology of materials at high magnifications (typically 1000× to 100,000×). The SEM method can be performed by distributing a representative portion of the zeolite powder on a suitable mount such that individual particles are reasonably evenly spread out across the field of view at 1000× to 100,000× magnification. From this population, a statistically significant sample of random individual crystals (e.g., 50-200) are examined and the longest diagonal of the individual crystals are measured and recorded. (Particles that are clearly large polycrystalline aggregates should not be included the measurements.) Based on these measurements, the d50 and d90 of the sample crystal sizes is calculated.

JMZ-12 zeolites can be used as a catalyst and/or adsorbent. In a preferred example of a catalyst composition, one or more catalytically active metals or metals that otherwise improve the performance of the catalyst composition (collectively, "enhancing metal") is exchanged into the JMZ-12. The exchange of enhancing metals can be accomplished post zeolite synthesis via incipient wetness, solid state ion exchange, or during the preparation of a washcoat slurry, or in-situ during the synthetization step by the addition of the enhancing metal(s) into the reaction mixture. Any one of the abovementioned metals can be used in combination with any of the other methods, for example, to incorporate two or more enhancing metals into the zeolite.

Preferably, the enhancing metals are non-framework metals. As used herein, a "non-framework metal" is a metal that resides within the zeolite pores and/or on at least a portion of the zeolite surface, preferably as an ionic species, does not include aluminum, and does not include atoms constituting the framework of the molecular sieve. Preferably, the presence of an enhancing metal(s) facilitates the treatment of exhaust gases, such as exhaust gas from a diesel engine, including processes such as NO), reduction, $NH_3$ oxidation, and NO), storage.

Enhancing metals include certain transition metals, such as copper (Cu), iron (Fe), manganese (Mn), nickel (Ni), molybdenum (Mo), and zinc (Zn), with copper and/or iron being preferred and copper being most preferred. Certain enhancing metals are precious metals, such as gold (Au) and silver (Ag), and also platinum group metals such as platinum (Pt), palladium (Pd), ruthenium (Ru), and rhodium (Rh). Additionally, enhancing metals can be one or more rare earth metals such as cerium (Ce), praseodymium (Pr), neodymium (Nd), europium (Eu), erbium (Er), gadolinium (Gd), ytterbium (Yb), and yttrium (Y) which can be used to improve catalytic performance, particularly when used in combination with a transition metal. (Although yttrium can be described as a transition metal, it is referred to herein as a rare earth metal due to its lanthanide-like properties.) Preferred rare earth metals include yttrium and erbium. In certain examples, JMZ-12 zeolite catalyst uses one or more transition metals in combination with one or more rare earth metals.

Preferably, transition metals are incorporated into JMZ-12 zeolites after synthesis via an ionic exchange process. Rare earth metals are preferably incorporated into JMZ-12 either in-situ, post synthesis, or both. For example, cerium and yttrium may be incorporated into the zeolite by post-synthesis ion exchange. Alternatively, yttrium may be incorporated in-situ and cerium may be incorporated by post-synthesis ion exchange. Preferred catalysts, particularly for the treatment of exhaust gas, include JMZ-12 having exchanged copper and exchanged yttrium, having exchanged copper and exchanged cerium, having exchanged copper, exchanged yttrium, and exchanged cerium, or having exchanged copper, exchanged cerium, and yttrium incorporated in-situ.

When two or more enhancing metals are present in JMZ-12 zeolite catalyst, each of those metals may independently be locally concentrated in different locations within a zeolite crystal or may have a concentration gradient within the crystal. For example, JMZ-12 zeolite catalyst may have relatively higher concentration of yttrium and/or erbium in an interior zone of the crystal relative to an exterior zone, may have relatively higher concentration of copper and/or cerium in an exterior zone of the crystal relative to an interior zone, or both. As used herein, an "interior zone" of a zeolite crystal means the interior 50% of the crystal by volume and "exterior zone" of a zeolite crystal means the exterior 50% of the crystal by volume. For example, yttrium can be present in the interior and exterior zones of JMZ-12 crystals in a ratio of about 60:40, about 70:30, about 80:20, or about 90:10. Erbium can be present in the interior and exterior zones of JMZ-12 crystals in a ratio of about 60:40, about 70:30, about 80:20, or about 90:10. Copper can be present in the exterior and interior zones of JMZ-12 zeolite crystals in a ratio of about 60:40, about 70:30, about 80:20, or about 90:10. Iron can be present in the exterior and interior zones of JMZ-12 zeolite crystals in a ratio of about 60:40, about 70:30, about 80:20, or about 90:10. Cerium can be present in the exterior and interior zones of JMZ-12 crystals in a ratio of about 60:40, about 70:30, about 80:20, or about 90:10.

The one or more enhancing metals are preferably present in the disordered zeolite material at a concentration of about 0.1 to about 10 weight percent (wt. %) based on the total weight of the zeolite, for example from about 0.5 wt. % to about 5 wt. %, from about 0.5 to about 1 wt. %, about 1 to about 1.5 wt. %, about 1 to about 2 wt. %, from about 1 to about 5 wt. %, about 2.5 wt. % to about 3.5 wt. %, and from about 3.5 to about 5 wt. %. For embodiments which utilized two or more enhancing metals, each metal independently can be present in the abovementioned amounts.

Catalysts which utilize copper, iron, or the combination thereof, preferably have a concentration of these transition metals in JMZ-12 zeolite material of about 1 to about 5 weight percent, more preferably about 2.5 to about 4.5 weight percent based on the total weight of JMZ-12 zeolite. Catalysts which utilize copper and a rare earth metal such as yttrium, preferably have a copper concentration of about 1 to about 5 weight percent, more preferably about 2.5 to about 3.5 weight percent, and a rare earth metal concentration of about to about 2 weight percent, based on the total weight of JMZ-12 zeolite.

Catalysts which utilize yttrium and/or erbium preferably have a concentration of these metals in JMZ-12 of about 0.05 to about 3 weight percent, such as about 0.1 to 1 weight percent, about 0.5 to 2 weight percent, or about 1 to 2 weight percent, based on the total weight of JMZ-12 zeolite. In certain embodiments, the yttrium and/or erbium is used to enhance the performance of a transition metal that is exchanged into the zeolite. Preferably, the presence of yttrium and/or erbium allows for at least a proportionate reduction in the amount of transition metal, such as copper, exchanged into JMZ-12 while still achieving similar catalytic performance compared to JMZ-12 zeolite having only copper exchanged into the zeolite at higher loadings.

The cerium concentration in the catalyst material can be from about 25 to about 550 $g/ft^3$. Other ranges of Ce are: over 100 $g/ft^3$; over 200 $g/ft^3$; over 300 $g/ft^3$; over 400 $g/ft^3$; over 500 $g/ft^3$; from about 75 to about 350 $g/ft^3$; Includes up to about 300 $g/ft^3$ and from about 100 to about 250 $g/ft^3$.

In certain embodiments, the concentration of Ce exceeds the theoretical maximum amount available for exchange on a metal promoted zeolite. Thus, in some embodiments, Ce is present in more than one form such as Ce ions, monomeric ceria, oligomeric ceria, and combinations thereof, provided that said oligomeric ceria is less than 5 μm, for example, It has an average crystal size of less than 1 μm, about 10 nm to about 1 μm, about 100 nm to about 1 μm, about 500 nm to about 1 μm, about 10 to about 500 nm, about 100 to about 500 nm, and about 10 to about 100 nm. As used herein, the term "monomer ceria" means $CeO_2$ as an individual molecule or moiety that is free on and/or within the zeolite or is weakly bound to the zeolite. As used herein, the term "oligomeric ceria" means nanocrystalline $CeO_2$ that is free on and/or within the zeolite or is weakly bound to the zeolite.

In certain examples, the catalyst composition is essentially free of certain catalytically active or enhancing metals or metal impurities. With reference to a catalytically active or enhancing metal, the term "essentially free" means that the material does not have an appreciable amount of the particular metal. That is, the particular metal is not present in amount that would affect the basic physical and/or chemical properties of the material, particularly with respect to the material's capacity to selectively reduce or store $NO_x$. Examples catalyst composition being essentially free of catalytically active or enhancing metals include the catalyst composition having less than 0.5 wt. %, 0.1 wt. %, 0.05 wt. % or 0.01 wt. % of the specified metal based on the total weight of the catalyst composition.

The catalyst composition can be essentially free of any rare earth metals. Alternatively, the catalyst composition may be essentially free of rare earth metals except yttrium, essentially free of rare earth metals except yttrium and erbium, or essentially free of rare earth metals except erbium.

The catalyst composition can be essentially free of any precious metals. Alternatively, the catalyst composition may be essentially free of precious metals except palladium, platinum, and rhodium, essentially free of precious metals except palladium and platinum, or essentially free of precious metals except palladium.

The catalyst composition can be essentially free of any non-framework transition metal. Alternatively, the catalyst composition may be essentially free of non-framework transition metals except copper and iron. In certain examples, the catalyst is essentially free of any non-framework transition metal except copper.

It will be understood that JMZ-12 zeolite catalysts which are characterized as being essentially free of a metal can be free of any combination of excluded metals as described herein. For example, a catalyst composition can be essentially free of any non-framework transition metal except copper and essentially free of rare earth metals except yttrium or essentially free of any non-framework transition metal except copper and essentially free of rare earth metals except erbium.

Metal exchanged JMZ-12 zeolite catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. In certain embodiments, a washcoat containing the catalyst is applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, the present invention provides a catalyst article comprising a JMZ-12 catalyst described herein coated on and/or into a substrate or is formed as an extruded catalyst body.

Certain aspects of the invention provide a catalytic washcoat designed to be applied to a substrate. A washcoat comprising JMZ-12 zeolite catalyst described herein is preferably a solution, suspension, or slurry. Such washcoats can also include non-catalytic components, such as fillers, binders, stabilizers, rheology modifiers, and other additives, including one or more of alumina, silica, non-zeolite silica alumina, titania, zirconia, and ceria. These non-catalytic components are present in the catalyst composition but serve one or more non-catalytic purposes. For embodiments where the molecular sieve in the catalyst contains Ce, the corresponding washcoat may further comprise a binder containing Ce or ceria. For such embodiments, the Ce-containing particles in the binder are significantly larger than the Ce-containing particles in the catalyst.

In certain embodiments, the catalyst washcoat composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc.

Two of the most common substrate designs to which catalyst may be applied are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate.

Wall-flow substrates have a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Preferred wall-flow filters have a porosity of about 30 to about 80%, for example about 40 to about 75%, about 40 to about 65%, or from about 50 to about 60%. Porosity is a measure of the percentage of void space in a porous substrate and is related to backpressure in an exhaust system: generally, the lower the porosity, the higher the backpressure.

Preferred wall-flow filters also have a pore interconnectivity volume of at least about 30%, more preferably at least about 40%. Pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate.

The mean pore size of the preferred wall-flow filters is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. In certain embodiments the plate substrate is constructed of metal, preferably corrugated metal.

Also provided is process for manufacturing a catalytic article. In a particular embodiment, the catalyst article is produced by a process that includes the steps of applying JMZ-12 catalyst composition, preferably as a washcoat, to a substrate as a layer or zone. The washcoat can be coated on a suitable substrate as a surface coating, a coating that penetrate a portion of the substrate, a coating that permeates the substrate, or some combination thereof. Either before or after JMZ-12 zeolite catalyst washcoat is applied to the substrate, one or more additional layer of another composition for treating exhaust gas can be applied to the substrate. The one or more catalyst layers on the substrate, along with JMZ-12 catalyst, are arranged in full or partial layers, consecutive layers, or in zones, such as a front and rear zone. As used herein, the term "consecutive" with respect to catalyst layers on a substrate means that each layer is contact with its adjacent layer(s) and that the catalyst layers as a whole are arranged one on top of another on the substrate.

The JMZ-12 catalyst can be disposed on the substrate as a first layer or zone and another composition, such as an oxidation catalyst, reduction catalyst, scavenging component, or NO), storage component, is disposed on the substrate as a second layer or zone.

In general, the production of an extruded solid body, such as honeycomb flow-through or wall-flow filter, containing the JMZ-12 catalyst involves blending JMZ-12 catalyst, a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular, using an extrusion press or an extruder including an extrusion die, and the resulting moldings are dried and calcined. The organic additives are "burnt out" during calcinations of the extruded solid body. A JMZ-12 catalyst may also be washcoated or otherwise applied to the extruded solid body as one or more sub-layers that reside on the surface or penetrate wholly or partly into the extruded solid body. Preferably, JMZ-12 zeolite catalyst is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g., using mercury intrusion porosimetry.

The JMZ-12 zeolite catalyst described herein can promote the reaction of a reductant, preferably ammonia, with nitrogen oxides to selectively form elemental nitrogen ($N_2$) and water ($H_2O$). Thus, in one embodiment, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate. Preferably, the catalyst has a low $N_2O$ selectivity. $N_2O$ selectivity is defined as the moles $N_2O$ formed divided by the moles of $NO_x$ ($NO_x$ defined as NO and $NO_2$) converted. Lower $N_2O$ selectivity is desired because of the need to reduce $N_2O$ formation.

The JMZ-12 catalyst described herein can also promote the oxidation of ammonia. Thus, in another embodiment, the catalyst can be formulated to favor the oxidation of ammonia with oxygen, particularly at concentrations of ammonia typically encountered downstream of an SCR catalyst (e.g., ammonia oxidation (AMOX) catalyst, such as an ammonia slip catalyst (ASC)). In certain embodiments, JMZ-12 zeolite catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

The invention includes an ASC wherein SCR and AMOX operations are performed in series, wherein both processes utilize a catalyst comprising the JMZ-12 catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

The present invention can include an ASC catalytic article having a substrate with an inlet and an outlet; a first coating comprising a blend of: (1) platinum on a support, and (2) a first SCR catalyst comprising JMZ-12; and a second coating comprising a second SCR catalyst, which may be JMZ-12 or another metal loaded zeolite such as copper CHA, copper AEI, iron CHA, or iron AEI; wherein the support comprises at least one of a molecular sieve or a $SiO_2$—$Al_2O_3$ mixed oxide.

The second coating of the ASC that completely overlaps the first coating. In some embodiments, the second coating partially overlaps the first coating. In some embodiments, the second coating extends from the inlet end toward the outlet end covering less than a full length of the substrate. In some embodiments, the first coating extends from the outlet end towards the inlet end covering less than a full length of the substrate. In some embodiments, the second SCR catalyst is located on the inlet side of the coating comprising the blend of platinum on a support with the first SCR catalyst. In some embodiments, the second SCR catalyst is located on the outlet side of the coating comprising the blend of platinum on a support with the first SCR catalyst.

The platinum is present in an amount of at least one of: (a) 0.01-0.3 wt. %; (b) 0.03-0.2 wt. %; (c) 0.05-0.17 wt. %; and (d) 0.07-0.15 wt. %, inclusive, relative to the weight of the support of platinum+ the weight of platinum+ the weight of the first SCR catalyst in the blend. A weight ratio of the first SCR catalyst to platinum on the support may be in the range of at least one of: (a) 0:1 to 300:1, (b) 3:1 to 300:1, (c) 7:1 to 100:1; and (d) 10:1 to 50:1, inclusive, based on the weight of these components.

The blend in the ASC further comprises at least one of palladium (Pd), gold (Au) silver (Ag), ruthenium (Ru) or rhodium (Rh).

A suitable substrate for the ammonia slip catalyst may include cordierite, a high porosity cordierite, a metallic substrate, an extruded SCR, a filter, or an SCRF.

Accordingly, provided is a method for the reduction of $NO_x$ compounds and/or oxidation of $NH_3$ in a gas, which comprises contacting the gas with a catalyst composition described herein for the catalytic reduction of NO compounds for a time sufficient to reduce the level of $NO_x$ compounds and/or $NH_3$ in the gas. In certain embodiments, provided is a catalyst article having an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

The SCR and/or AMOX process is preferably performed at a temperature of at least 150° C., for example from about 150° C. to about 750° C., from about 175 to about 550° C., from about 175 to about 400° C., from about 450 to about 900° C., and more preferably about 450 to about 750° C., about 450 to about to 650° C., or about 450 to about 550° C. Utilizing temperatures greater than 450° C. is particularly useful for treating exhaust gases from a heavy and light duty diesel engine that is equipped with an exhaust system comprising (optionally catalyzed) diesel particulate filters which are regenerated actively, e.g., by injecting hydrocarbon into the exhaust system upstream of the filter, wherein the zeolite catalyst for use in the present invention is located downstream of the filter.

Additionally, methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the $NO_x$ concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the JMZ-12 catalyst described herein and at least one additional component for treating the exhaust gas, wherein the catalytic article and at least one additional component are designed to function as a coherent unit. The system can comprise a catalytic article comprising a JMZ-12 catalyst described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing NO reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$.

In another embodiment, the system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g., at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g., wall flow filters. Where the filter is catalyzed, e.g., with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

EXAMPLES

Examples 1-5

Zeolite synthesis of different members of the JMZ-12 family using a mixture of two structure directing agents (SDAs) that includes both N,N-dimethyl-3,5-dimethylpiperidinium hydroxide (3,5-DMDMPOH) and tetraethylammonium hydroxide (TEAOH).

Aqueous reaction mixtures were prepared that contained FAU zeolite as a source of alumina, a source of silica, and $Na_2O$, in a molar ratio of 68 $SiO_2$:1 $Al_2O_3$: 19.5 $Na_2O$: 750 $H_2O$ and further contained an SDA having both 3,5-DMDMPOH and TEAOH in the molar ratios shown in Table 1.

TABLE 1

| Example | 3,5-DMDMPOH(x) | TEAOH(y) | AEI/CHA | SAR | MicroPore Vol($cm^3 g^{-1}$) |
|---|---|---|---|---|---|
| 1 | 4.5 | 1.3 | 90/10 | 15.8 | 0.22 |
| 2 | 4 | 1.8 | 67/33 | 16.0 | 0.23 |

TABLE 1-continued

| Example | 3,5-DMDMPOH(x) | TEAOH(y) | AEI/CHA | SAR | MicroPore Vol(cm³ g⁻¹) |
|---|---|---|---|---|---|
| 3 | 3.5 | 2.2 | 50/50 | 15.7 | 0.21 |
| 4 | 3 | 2.7 | 30/70 | 17.1 | 0.23 |
| 5 | 2.5 | 3.1 | 10/90 | 16.7 | 0.21 |

Table 1 shows synthesis and characterisation data for selected JMZ-12 samples with different degree of AEI/CHA intergrowth, prepared by tuning the ratio of 3,5-DMDM-POH and TEAOH. The ratio of AEI/CHA was determined by DIFFaX analysis of the X-ray diffraction patterns collected on the dehydrated H-form for each sample. Silica-to-alumina ratio (SAR) and micropore volume measured by X-ray Fluorescence (XRF) and Ar adsorption Isotherm respectively.

The reagents used and order of addition was:
a) Commercial FAU zeolite
b) $H_2O$
c) Solution of NaOH, 30 wt %
d) Tetraethylammonium hydroxide (TEAOH), 35 wt. %
e) N,N-dimethyl-3,5-dimethylpiperidinium hydroxide (3,5-DMDMPOH), 47 wt. %.
f) Sodium Silicate In a typical example 34.700 g of a commercial FAU ($Al_2O_3$=18.49 wt. %, $SiO_2$=59.65 wt. %, $Na_2O$=0.14 wt. %) were mixed with 226 mL of water under stirring. To this, 19.05 g of NaOH (30 wt. %), 58.54 g of TEAOH (35 wt. %), 74.55 g of 3,5-DMDMPOH (47 wt. %) and 833.26 g sodium silicate solution ($Na_2O$ wt. %=8.60 wt. %, $SiO_2$=28.4 wt. %) were sequentially added into the mixture to yield a synthesis gel with a corresponding molar gel composition of 68.1 $SiO_2$-1.0 $Al_2O_3$— 19.5 $Na_2O$-3.5 3,5-DMDMPOH—2.2 TEAOH-750.1 $H_2O$.

Figure 2:
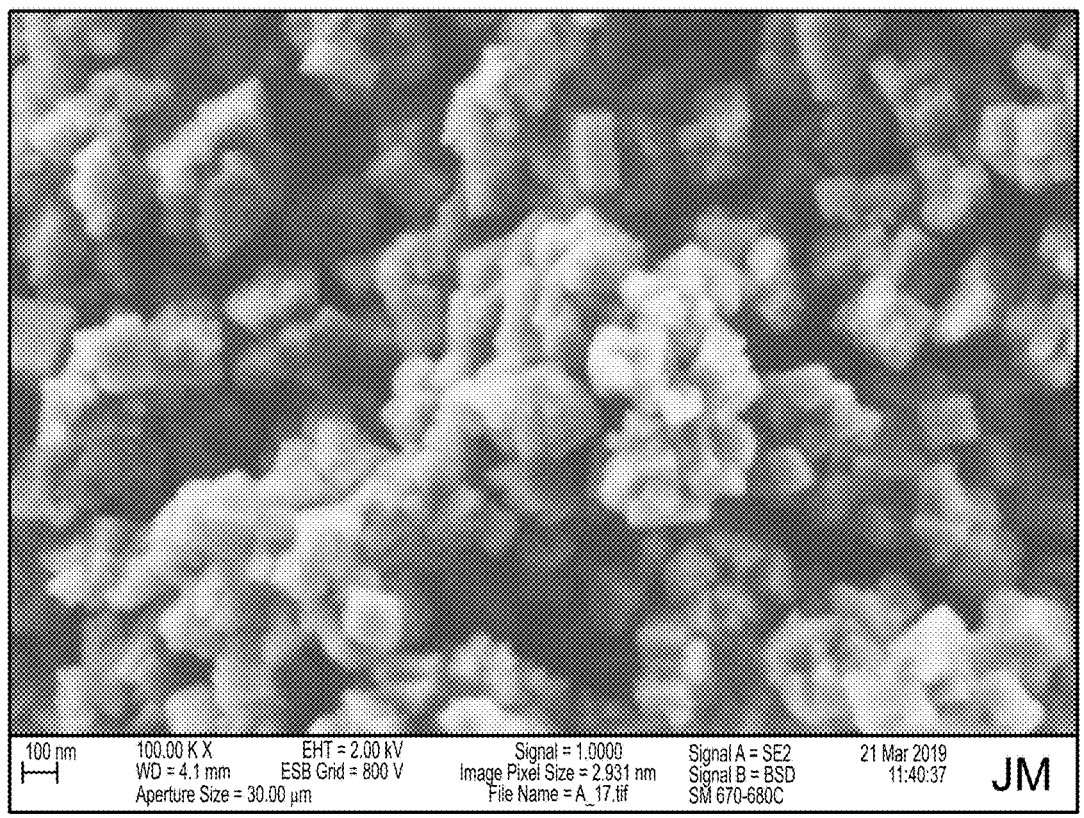
FIG. 2 shows scanning electron micrograph (SEM) of as made JMZ-12 from Example 2.
Figure 3:
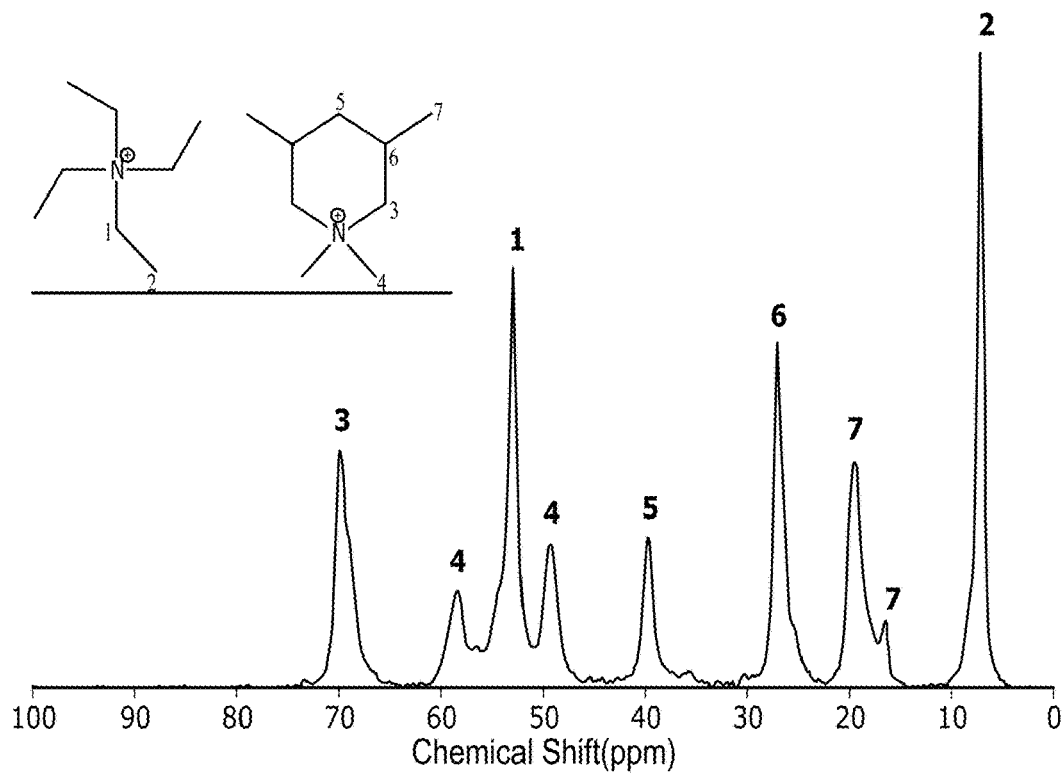
FIG. 3 shows $^{13}$C Magic angle spinning nuclear magnetic resonance (MAS NMR) spectrum of as made JMZ-12 from Example 2 showing that both SDAs used in synthesis remain occluded in the zeolite at the end of crystallization.
Figure 4:
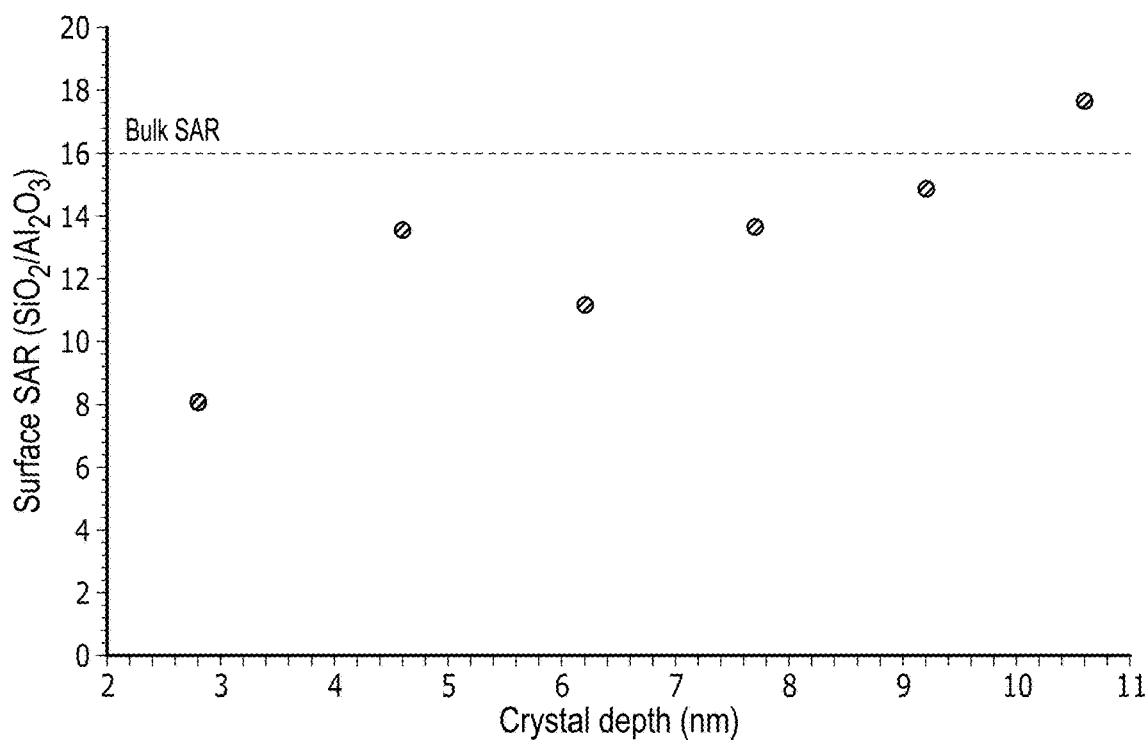
FIG. 4 shows surface SAR determined by synchrotron radiation X-ray photoelectron spectroscopy (SR-XPS) Deep Profiling of JMZ-12 zeolite (Example 2) with an AEI/CHA intergrowth ratio of 67/33. The bulk SAR of this sample was measured as 16 by XRF.

After stirring the mixture for 1 hour, the gel was transferred to 1.5L autoclave and heated for 48 hours at 120° C. with rotation (300 rpm). At the end of the reaction time, the contents of the autoclave were filtered and washed with de-mineralised water. The resulting product was dried overnight at 110° C. X-Ray Diffraction (XRD) patterns (see FIG. 1) were obtained for each powder sample. The XRD indicated that the product is an intergrowth of the AEI/CHA zeolite structures (JMZ-12) with different degrees of intergrowth depending on the molar ratio of the organic templates in the gel. FIG. 2 shows the crystal morphology of the samples and FIG. 3, the $^{13}C$ magic angle spinning nuclear magnetic resonance (MAS NMR) spectrum of one of the materials, showing that both SDAs remain occluded in the samples at the end of the crystallization. FIG. 4 shows the surface silica to alumina ratio (SAR) determined by synchrotron radiation X-ray photoelectron spectroscopy (SR-XPS) Deep Profiling of JMZ-12, showing the difference between the bulk SAR and the surface SAR of the crystals.

Figure 5:
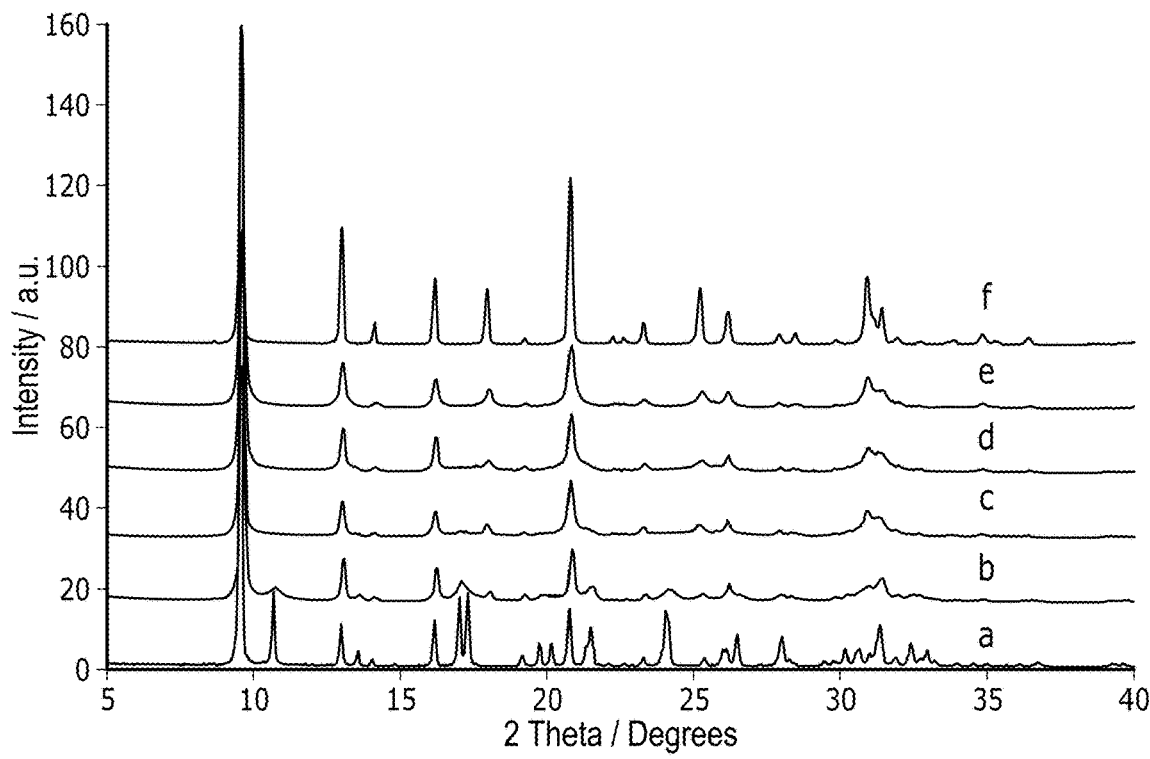
FIG. 5 shows Powder X-ray Diffraction (XRD) patterns of selected activated JMZ-12 samples (H-form) compared to those of pure AEI and CHA: a) Pure AEI; b) Example 2; c) Example 3; d) Example 4; e) Example 5; f) Pure CHA. All XRD patterns were collected on the hydrated form.
Figure 6:
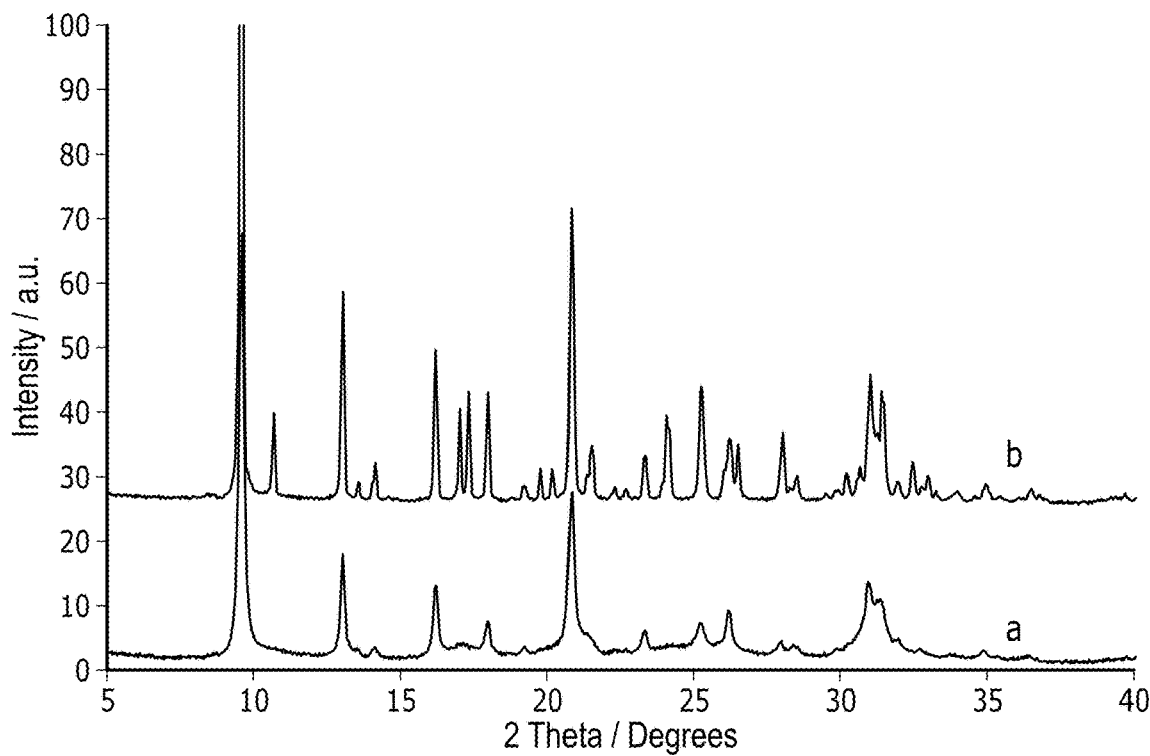
FIG. 6 shows comparison of Powder X-ray Diffraction (XRD) patterns of a) activated JMZ-12 from Example 3 corresponding to AEI/CHA 50/50 intergrowth and b) 50/50 physical mixture of CHA and AEI zeolites. Both XRD patterns were collected on the hydrated form.

The as-made zeolites were activated by calcining in air. The solid was heated to 110° C. at 2° C./min then heated to 450° C. at 5° C./min and held at 450° C. for 16 hours. Finally, the material was heated to 550° C. at 5° C./min at held at 550° C. for 16 hours. Once the solid had cooled to room temperature, it was ion-exchanged with a 1 M solution of ammonium sulfate using 10 ml of solution per gram of calcined zeolite. The ion-exchange was carried out with stirring at room temperature for 1 hour. Agitation was stopped and the slurry centrifuged. The clear supernatant was decanted off. The ion-exchange procedure was then repeated following which the zeolite was filtered, washed, and then dried. The resulting $NH_4$-form zeolite was converted to the H-form by calcining, in air, by heating to 150° C. at 2° C./min and holding at 150° C. for 10 hours followed by heating to 450° C. at 5° C./min with a final hold at 450° C. for 16 hours. XRD patterns of selected active materials are shown in FIG. 5 together with comparison of a pure phase AEI and CHA zeolite structures. Table 1 above summarises the SAR of selected samples as measured by XRF and their micropore volume by Ar adsorption isotherm. The ratio of AEI/CHA was determined by DIFFaX analysis of the X-ray diffraction patterns collected on the dehydrated H-form of each sample. FIG. 6 shows the XRD pattern of a physical mixture of AEI/CHA zeolites compared to that of JMZ-12 zeolite with an AEI/CHA intergrowth ratio 50/50.

Example 6: Selective Catalytic Reduction (SCR) Performance (Fresh)

JMZ-12 zeolite was synthesized according to the methods described herein (Example 2 activated, H-form). The zeolite had a SAR of 16. The zeolite was impregnated with metal using the required amount of copper (II) acetate dissolved in de-mineralized water. The metal impregnated zeolite was dried overnight at 80° C. and then calcined in air at 550° C. for 4 hours. Copper was added to the zeolite to achieve a JMZ-12 having 3.3 wt. % copper based on the total weight of the zeolite.

Pelletized sample of the copper JMZ-12 zeolite was placed in a test rig. To assess the zeolite's SCR performance over a range of temperatures, the zeolite was subjected to a flow of simulated diesel engine exhaust gas having the following properties: 500 ppm $NH_3$, 500 ppm NO, 0 ppm $NO_2$, SV=90 K h–. The sample was heated from room temperature to 150° C. under the above-mentioned gas mixture except for $NH_3$. At 150° C., $NH_3$ was added into the gas mixture and the sample was held under these conditions for 30 minutes. The temperature was then increased from 150° C. to 500° C. at a rate of 5° C./minute. The downstream gas treated by the zeolite was monitored to determine $NO_x$ conversion and $N_2O$ selectivity. For comparison, similar testing was performed on a CHA zeolite having a SAR of 22 and an AEI zeolite having a SAR of 20, each having a copper loading comparable to the copper JMZ-12.

Figure 7:
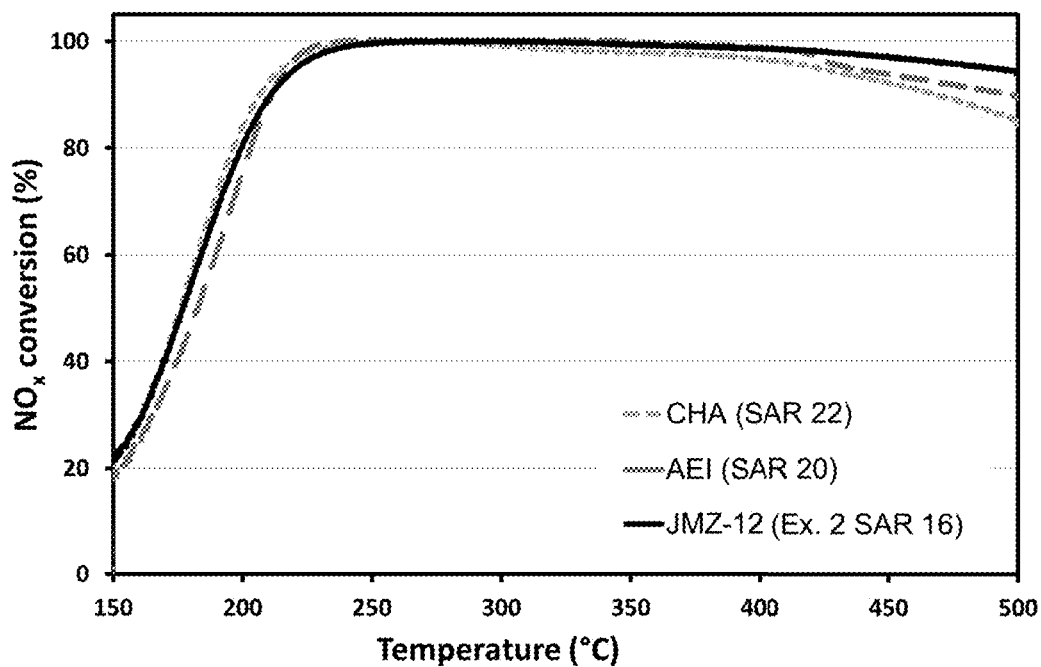
FIG. 7 shows $NO_x$ conversion for the fresh copper JMZ-12 (H-form Example 2) compared to that of pure copper AEI and copper CHA zeolites for the Selective Catalytic Reduction (SCR) of $NO_x$.
Figure 8:
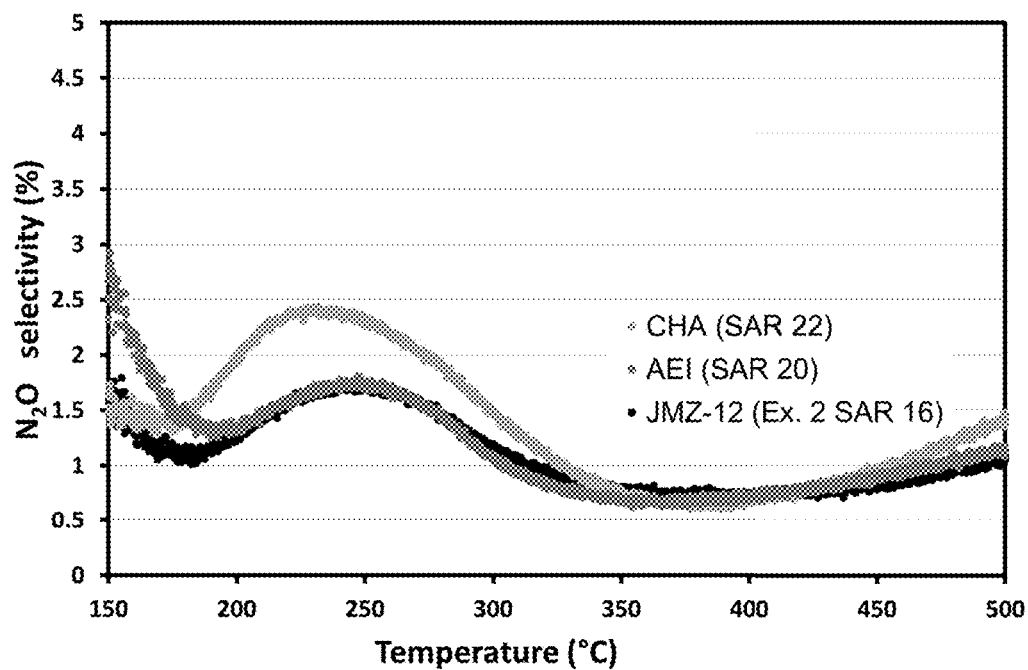
FIG. 8 shows $N_2O$ selectivity for the fresh copper JMZ-12 (H-form Example 2) compared to that of pure copper AEI and copper CHA zeolites for the Selective Catalytic Reduction (SCR) of $NO_x$.

As shown in FIG. 7, the copper JMZ-12 achieved higher $NO_x$ conversion at temperatures above 400° C. compared to the copper AEI zeolite and the copper CHA zeolite. As shown in FIG. 8, the copper JMZ-12 exhibited equivalent or lower $N_2O$ selectivity across the entire temperature range (150-500° C.) compared to either the copper AEI zeolite or the copper CHA zeolite. Thus, the copper JMZ-12 catalyst exhibited significant advantages in both $NO_x$ conversion and $N_2O$ selectivity relative to a typical Cu-exchanged CHA or AEI zeolite.

Examples 7 and 8: Selective Catalytic Reduction (SCR) Performance (Aged)

A set of samples of copper JMZ-12 zeolite, copper AEI zeolite, and copper CHA zeolite similar to those of Example 6 were prepared and then hydrothermally aged at 750° C. for 80 hours in air with 10% $H_2O$ by volume. Samples of the powdered catalyst were pelletized and then heated from room temperature to 250° C. in air only at a rate of 10° C./min. The samples were then heated at a rate of 10° C./min in 10% $H_2O$ by volume in air to 750° C. After being held at a temperature of 750° C. for 80 hours, the samples were cooled in the steam/air mixture until the temperature was less than 250° C. The samples were then cooled from 250° C. to room temperature in air only flow. These samples were tested on the rig under conditions similar to those described in Example 6.

Another set of samples of copper JMZ-12 zeolite, copper AEI zeolite, and copper CHA zeolite similar to those of Example 6 were prepared and then hydrothermally aged at 900° C. for 5 hours in air with 4.5% $H_2O$ by volume. Samples of the powdered catalyst were pelletized and then heated from room temperature to 250° C. in air only at a rate of 10° C./min. The samples were then heated at a rate of 10° C./min in 4.5% $H_2O$ by volume in air to 900° C. After being held at a temperature of 900° C. for 5 hours, the samples were cooled in the steam/air mixture until the temperature was less than 250° C. The samples were then cooled from 250° C. to room temperature in air only flow. These samples were tested on the rig under conditions similar to those described in Example 6.

Figure 9:
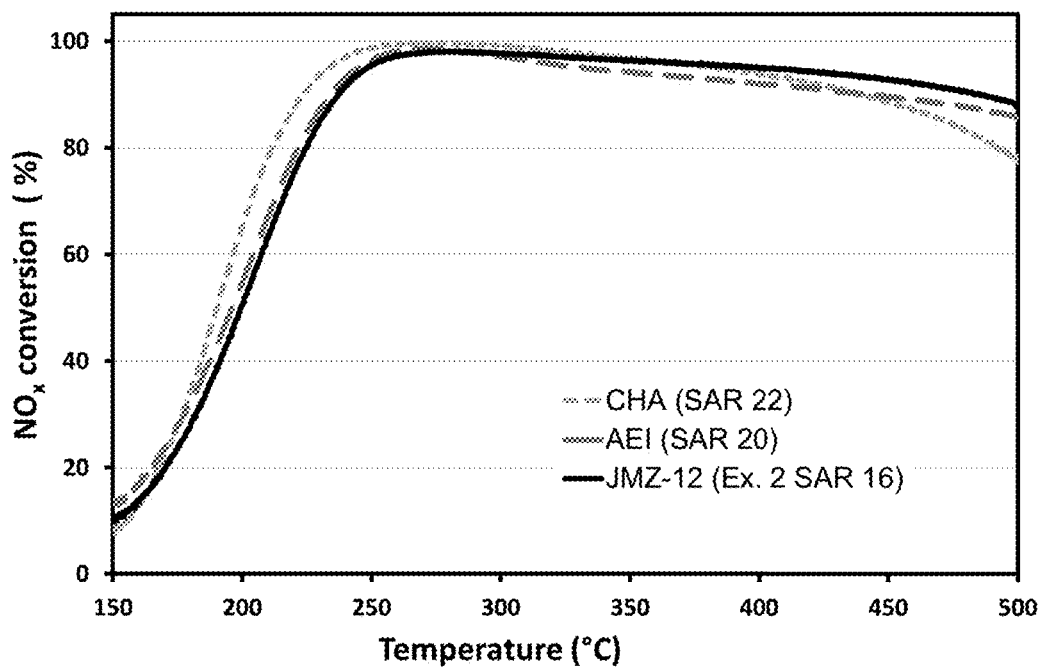
FIG. 9 shows $NO_x$ conversion for the copper JMZ-12 (H-form Example 2) compared to that of pure copper AEI and copper CHA zeolites for the Selective Catalytic Reduction (SCR) of $NO_x$. All samples aged at 750° C. for 80 hours.
Figure 10:
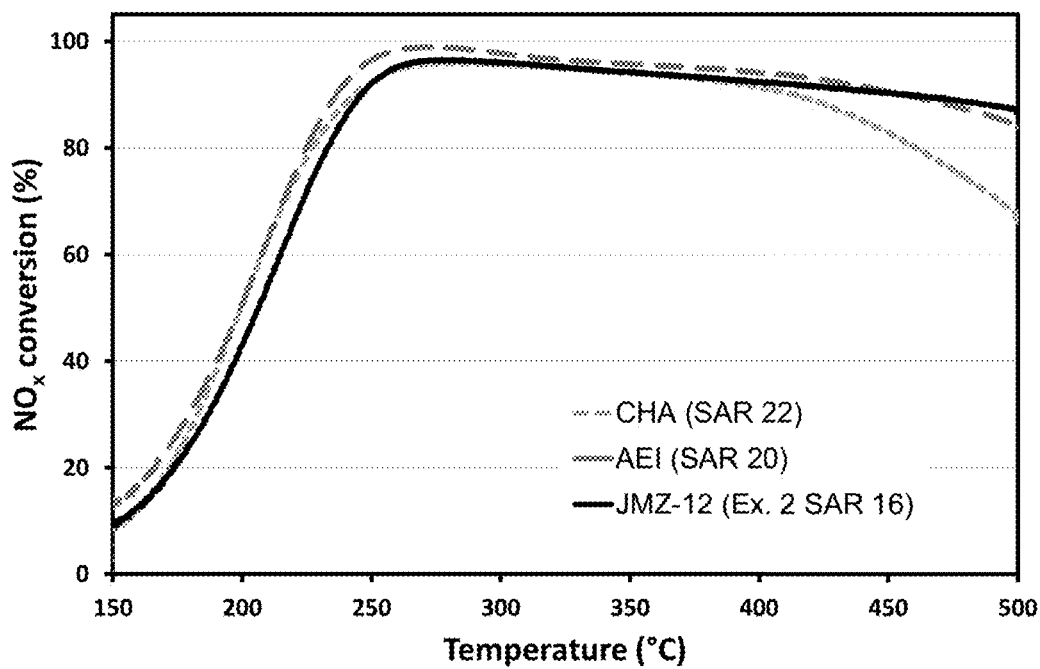
FIG. 10 shows $NO_x$ conversion for the copper JMZ-12 (H-form Example 2) compared to that of pure copper AEI and copper CHA zeolites for the Selective Catalytic Reduction (SCR) of $NO_x$. All samples aged at 900° C. for 5 hours.
Figure 11:
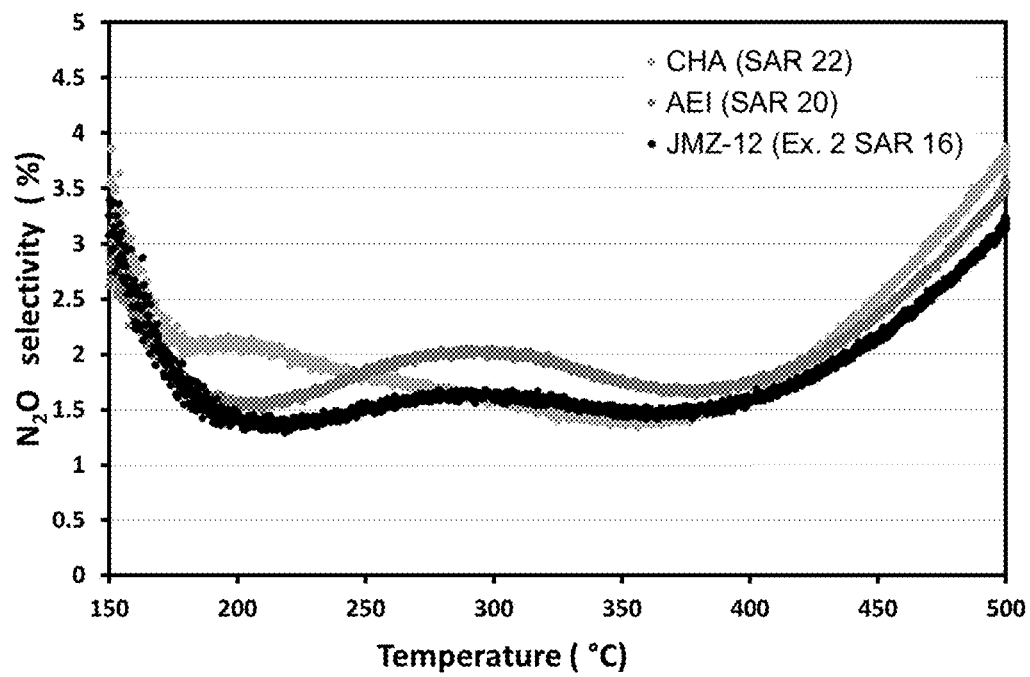
FIG. 11 shows $N_2O$ selectivity for the fresh copper JMZ-12 (H-form Example 2) compared to that of pure copper AEI and copper CHA zeolites for the Selective Catalytic Reduction (SCR) of $NO_x$. All samples aged at 750° C. for 80 hours.

As shown in FIGS. 9 and 10, the copper JMZ-12 samples aged at 750° C. and at 900° C., respectively, had similar or greater NO conversion performance compared to similarly aged copper AEI zeolite and copper CHA zeolite. These results are surprising because the relatively higher SAR of the AEI and CHA zeolites are expected to be more hydrothermally stable compared to the relatively lower SAR of copper JMZ-12. In addition, the data in FIG. 11 shows that the copper JMZ-12 aged at 750° C. exhibited lower $N_2O$ selectivity across the entire temperature range (150-500° C.) compared to either the copper AEI zeolite or the copper CHA zeolite which were aged under similar conditions. These results demonstrate the catalyst of the present invention, JMZ-12, is hydrothermally stable. Furthermore, copper loaded JMZ-12 exhibits benefit as a NO), abatement catalyst relative to copper loaded AEI or CHA.

Example 9: Selective Catalytic Reduction (SCR) Performance (Aged)

Figure 12:
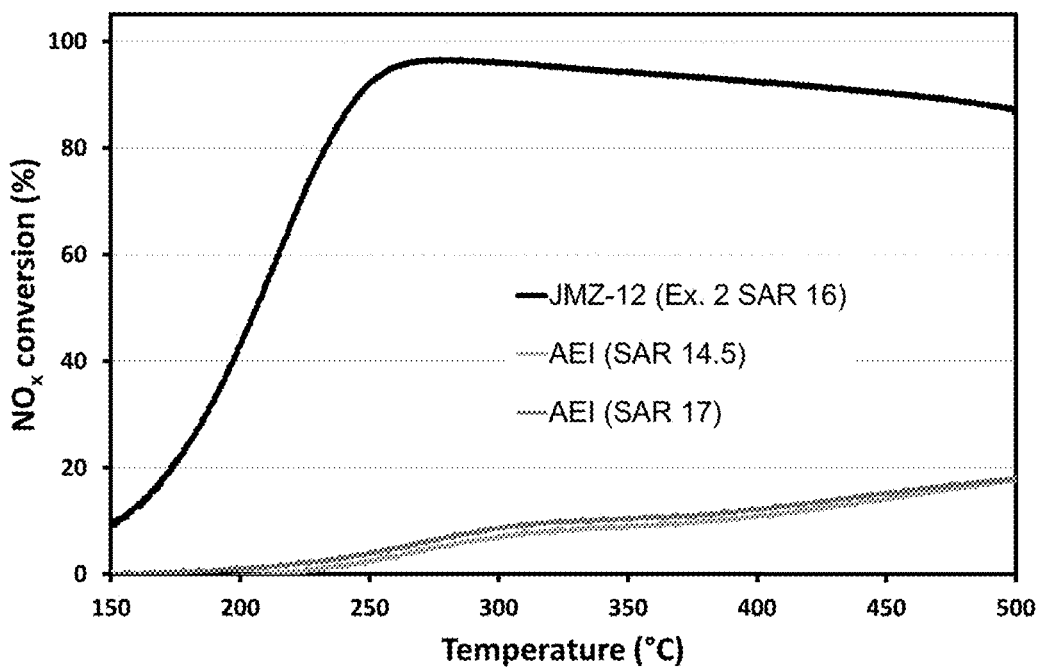
FIG. 12 shows $NO_x$ conversion for the copper JMZ-12 (H-form Example 2) compared to that of two pure AEI zeolites with different SAR for the Selective Catalytic Reduction (SCR) of NOx after aging at 900° C. for 5 hours.
Figure 13:
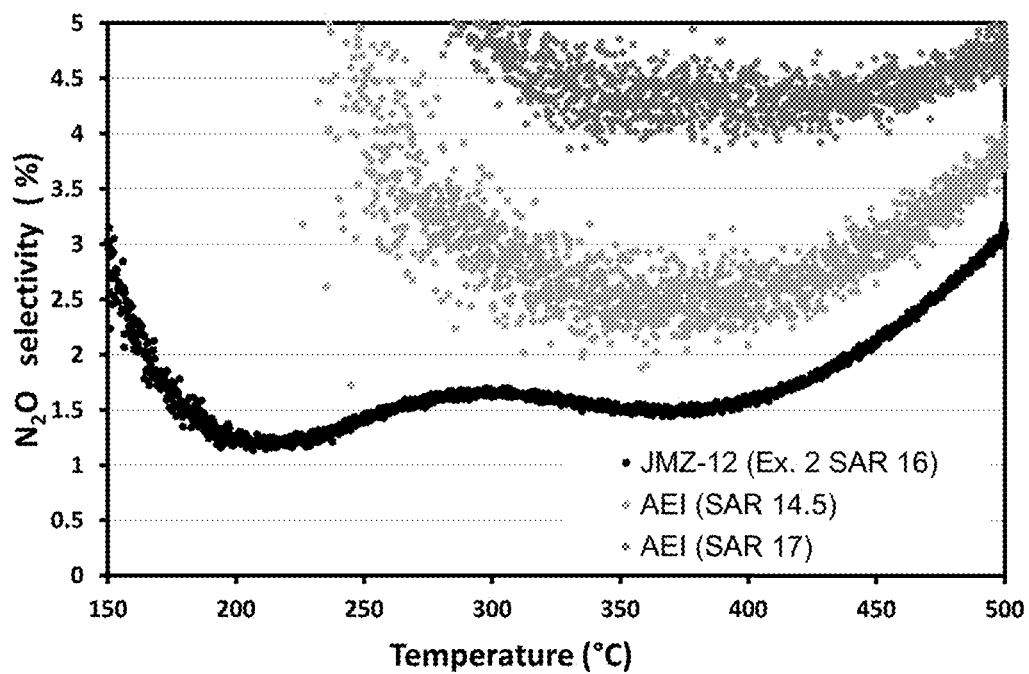
FIG. 13 shows $N_2O$ selectivity for the copper JMZ-12 (H-form Example 2) compared to that of two pure AEI zeolites with different SAR for the Selective Catalytic Reduction (SCR) of NOx after aging at 900° C. for 5 hours.

The $NO_x$ conversion performance and $N_2O$ selectivity of a copper JMZ-12 similar to the one described in Example 8 (aged at 900° C.) was compared the performance of copper loaded AEI zeolites having similar SAR values. As shown in FIGS. 12 and 13, a copper JMZ-12 having a SAR of 16 and aged at 900° C. achieved higher NO conversions and lower $N_2O$ selectivity across the entire temperature range (150-500° C.) compared to the copper loaded AEI zeolites. Furthermore, both the copper AEI zeolite having a SAR of 16.9 and the copper AEI zeolite having a SAR of 14.6 suffered significant performance degradation after hydrothermal aging at 900° C. These results demonstrate the benefits of utilizing copper loaded JMZ-12 as a NOx abatement catalyst over a copper loaded AEI zeolite.

Example 10: Selective Catalytic Reduction (SCR) Performance in the Presence of Rare-earth Metals JMZ-12 zeolite was synthesized according to the methods described herein (Example 5 activated, H-form). The zeolite had a SAR of 16.7. The zeolite was ion-exchanged with a 0.1 M solution of Yttrium (III) nitrate using 80 ml of solution per gram of zeolite. The ion-exchange was carried out hydrothermally at 130° C. for 8 hours. The clear supernatant was decanted, and the solid product was washed and dried. Yttrium was added to the zeolite to achieve a JMZ-12 having 1.1 wt. % yttrium based on the total weight of the zeolite.

The yttrium-containing zeolite was then impregnated with copper using the required amount of copper (II) acetate dissolved in de-mineralized water. The metal impregnated zeolite was dried for 3 hours at 105° C. and then calcined in air at 500° C. for 2 hours. Copper was added to the zeolite to achieve a JMZ-12 having 3.0 wt. % copper based on the total weight of the zeolite.

To assess the zeolite's SCR performance, the JMZ-12 zeolite containing copper and yttrium was pelletised, placed in a testing rig and was subjected to a flow of simulated diesel engine exhaust gas having the following properties: 550 ppm $NH_3$, 500 ppm NO, 0 ppm $NO_2$, 10% $H_2O$, 8% $O_2$, $SV=90$ K $h^{-1}$. The sample was heated from room temperature to 150° C. under nitrogen and then exposed to the above-mentioned gas mixture for 1 minute. The temperature was then increased from 150° C. to 500° C. at a rate of 5° C./minute. The downstream gas treated by the zeolite was monitored to determine NO conversion and $N_2O$ selectivity. For comparison, similar testing was performed on a JMZ-12 zeolite (Example 5) containing the same amount of Cu (3.0 wt. %).

Figure 14:
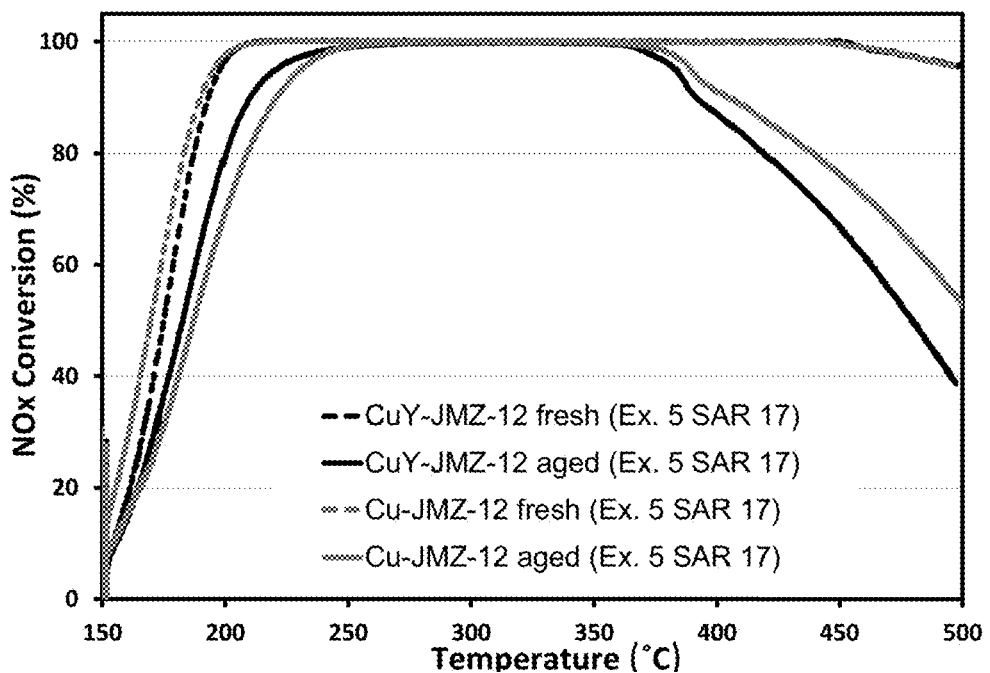
FIG. 14 shows $NO_x$ conversion for the copper, yttrium JMZ-12 compared to that of pure copper JMZ-12 (both JMZ-12, H-form Example 5) for the Selective Catalytic Reduction (SCR) of $NO_x$. Both samples were tested fresh and after 850° C. ageing for 16 hours.
Figure 15:
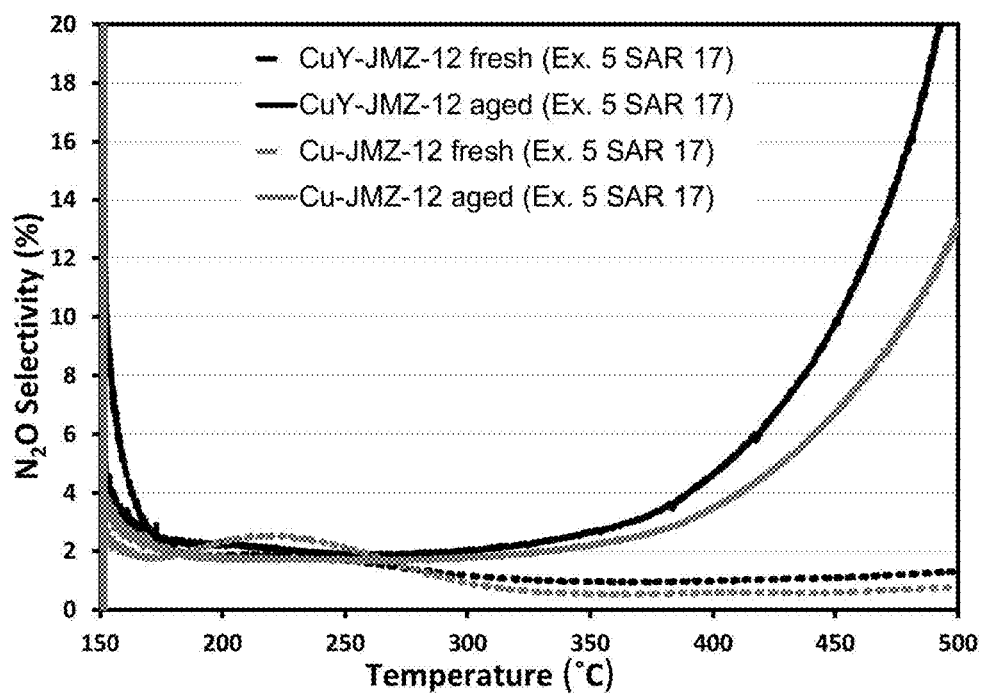
FIG. 15 shows $N_2O$ selectivity for the copper, yttrium JMZ-12 compared to that of pure copper JMZ-12 (both JMZ-12, H-form Example 5) for the Selective Catalytic Reduction (SCR) of $NO_x$. Both samples were tested fresh and after 850° C. ageing for 16 hours.

As shown in FIG. 14, the copper JMZ-12 achieved higher NO conversion across the whole temperature range compared to the copper yttrium JMZ-12. As shown in FIG. 15, the yttrium containing JMZ-12 exhibited better $N_2O$ selectivity in the temperature range (200-300° C.).

The same set of copper, yttrium and copper JMZ-12 was also hydrothermally aged at 850° C. for 16 hours in air with 10% $H_2O$ by volume. As shown in FIG. 14, the yttrium containing JMZ-12 achieved higher NO conversion compared to JMZ-12 in the low temperature range, below 250° C. As shown in FIG. 15, the yttrium containing JMZ-12 exhibited $N_2O$ selectivity similar compared to JM-12 in the same temperature range.

These results demonstrate the benefits of utilizing an yttrium containing copper JMZ-12 to improve low temperature NO abatement catalyst over a copper JMZ-12 zeolite.

The invention claimed is:

1. A method for synthesizing zeolites comprising the step of heating a reaction mixture under crystallization conditions for a sufficient period to form a disordered zeolite having both CHA and AEI topologies, wherein the reaction mixture comprises:
    a. at least one source of aluminum,
    b. at least one source of silicon,
    c. a source of alkaline or alkaline-earth cations,
    d. a structure direction agent containing at least one source of quaternary ammonium cations and at least one source of alkyl-substituted piperidinium cations in a molar ratio of about 0.20 to about 1.4, and
    e. is essentially free of halides.

2. The method of claim 1, wherein the source of quaternary ammonium is tetraethyl ammonium hydroxide and the source of alkyl-substituted piperidinium is N,N-dimethyl-3,5-dimethylpiperidinium hydroxide.

3. The method of claim 1, wherein said reaction mixture is essentially free of phosphorous.

4. The method of claim 1, wherein said reaction mixture has the following molar composition:
    a. $SiO_2/Al_2O_3$ ratio of about 10 to about 100, preferably from about 55 and to about 75;
    b. $X_2O/SiO_2$ ratio (X=Na, K, Cs, Li) of about 0.01 to about 0.5, preferably from about 0.01 to about 0.3;
    c. $SDA/SiO_2$ ratio of about 0.01 to about 0.5, preferably from about 0.05 to about 0.2;
    d. $OH/SiO_2$ ratio of about 0.1 to about 0.9, preferably from about 0.6 to 0.8;
    e. $H_2O/SiO_2$ ratio of about 3 to about 25, preferably from about 5 to about 15.

5. The method of claim 1 further comprising a subsequent calcining step conducted in an oxygen containing atmosphere.

6. A disordered zeolite synthesized according to the method of claim 1, wherein CHA and AEI topologies are the predominate phase and the CHA and AEI topologies are present in a molar ratio of about 95:5 to about 5:95.

* * * * *